United States Patent [19]
Kim et al.

[11] Patent Number: 5,329,762
[45] Date of Patent: Jul. 19, 1994

[54] METHOD FOR ASSEMBLING ROCKET PROPULSION MOTOR

[75] Inventors: Won Hoon Kim; Jung Rok Oh; Won Man Cho; Gwang Hwan Oh; Tae Ho Lee, all of Daejon, Rep. of Korea

[73] Assignee: Agency for Defense Development, Daejon, Rep. of Korea

[21] Appl. No.: 77,462

[22] Filed: Jun. 15, 1993

[30] Foreign Application Priority Data

Jun. 20, 1992 [KR] Rep. of Korea .............. 10786/1992

[51] Int. Cl.$^5$ .......................... B63H 11/00; F16J 9/00
[52] U.S. Cl. ........................................ 60/204; 60/271; 29/890.01; 277/9
[58] Field of Search .................... 60/204, 271; 29/458, 29/890.01; 277/9, 29

[56] References Cited

U.S. PATENT DOCUMENTS

| | | | |
|---|---|---|---|
| 3,490,121 | 1/1970 | Biehl et al. | 29/890.01 |
| 3,694,883 | 10/1972 | Olcott | 29/890.01 |
| 3,760,589 | 9/1973 | Puckett et al. | 60/271 |
| 4,150,540 | 4/1979 | Krayenbuhl et al. | 60/271 |
| 4,707,899 | 11/1987 | Singer | 60/271 |
| 4,856,163 | 8/1989 | Horiuchi et al. | 29/890.01 |
| 5,062,206 | 11/1991 | Myers et al. | 29/890.01 |
| 5,165,229 | 11/1992 | Svejkovsky | 60/271 |
| 5,206,989 | 5/1993 | Smith et al. | 29/890.01 |

OTHER PUBLICATIONS

A. A. McCool et al., "Space Shuttle Solit Rocket Motor Program, Lessons Learned", AIAA-91-2291, paper presented at 27th AIAA Joint Propulsion Conference, Sacramento, Calif., Jun. 24-26, 1991.
R. Cook et al., "Development of the Case-to-Nozzle Joint for the Space Shuttle Redesigned Solit Rocket Motor", AIAA-89-2773, paper presented at 25th AIAA Joint Propulsion Conference, Monterey, Calif., Jul. 10-2, 1989.
A. J. McDonald, "Return to Flight with the Redesigned Solit Rocket Motor", AIAA-89-2404, paper presented at 25th AIAA Joint Propulsion Conference, Monterey, Calif., Jul. 10-12, 1989.
General Electric Company-Silicon Products Division, Product Data for RTV 31, RTV 60, and RTV 88 Silicon Rubber Compounds 1985, CDS-1868.

Primary Examiner—Richard A. Bertsch
Assistant Examiner—Howard R. Richman
Attorney, Agent, or Firm—Scully, Scott, Murphy & Presser

[57] ABSTRACT

A method for assembling a rocket propulsion motor including a motor case and a nozzle assembly, wherein the assembling is carried out under vacuum so that air can not be presented between a silicon sealant layer and a first O-ring disposed between the motor case and the nozzle assembly, thereby preventing the generation of air passage and air pocket in a silicon sealant layer coated over the assembled portions of the rocket propulsion motor. The silicon sealant is prepared by mixing a silicon sealant material with a setting agent. The mixing is also carried out under vacuum, so as to prevent the sealant from containing air. For venting air from a space defined the silicon sealant layer and the first O-ring under vacuum, a plurality of spacing bolts are used which serve to space the motor case and the nozzle assembly at a predetermined distance.

3 Claims, 4 Drawing Sheets

METHOD FOR ASSEMBLING ROCKET PROPULSION MOTOR

BACKGROUND OF THE INVENTION

1. Field of the Invention

The present invention relates to a method for assembling a rocket propulsion motor, and more particularly to a method for assembling a rocket propulsion motor, capable of achieving a sealing between the assembled portions of the rocket propulsion motor.

2. Description of the Prior Art

Rocket propulsion motors are well known as devices for supplying energy required for carrying flying objects or guided missile systems to designated positions or target points. A typical construction of such rocket propulsion motors is illustrated in FIGS. 1 and 2.

FIGS. 1 and 2 shows a general rocket propulsion motor using a solid propellant. As shown in the drawings, the rocket propulsion motor comprises a motor case 1 having a generally cylindrical shape and containing a propellant 3 therein, a nozzle assembly 2 mounted to a rear end of the motor case 1 and an ignitor 4 mounted to a front end of the motor case 1 and directed to the interior of the motor case 1.

In such a conventional construction, a combustion gas generated upon burning the propellant 3 is exhausted outwardly through the nozzle assembly 2. Since the interior of motor case 1 is at high temperature and pressure during the exhaust of combustion gas, a seal should be assured at assembled portions between the motor case 1 and the nozzle assembly 2. If such a seal is not assured, the assembled portions may be exposed to fumes of high temperature and pressure or the seal function is failed, thereby causing the overall rocket system to be adversely affected. In some cases, there is a dangerous explosion of the rocket itself.

Now, a conventional method for assembling such a rocket propulsion motor will be described, in conjunction with FIG. 3 which is an enlarged view of the assembled portions between the motor case and the nozzle assembly.

As shown in FIG. 3, the motor case 1 has at its inner periphery surface a liner 5, an insulating member 6 and a heat resistant member 7. The motor case 1 also has at its rear end a after dome flange 8 at which a plurality of threaded holes 8a uniformly spaced are formed. On the other hand, the nozzle assembly 2 has at its inner periphery surface a heat resistant member 7' and at its outer periphery surface a first O-ring 9 and a second O-ring 10. The nozzle assembly 2 also has at its other periphery surface a nozzle flange 12 at which a plurality of throughout holes 12a uniformly spaced are formed. In assembling, each throughout hole 12a is aligned with the corresponding threaded hold 8a so that a bolt 11 having a high tensile strength is threadedly received in the threaded hole 8a via the throughout hole 12a, as will be described hereinafter.

In assembling the motor case 1 and the nozzle assembly 2 with the above-mentioned constructions, first, surfaces of the heat resistant members 7 and 7' which will come into contact with each other are cleaned. Thereafter, a silicon sealant layer 13 is coated to a predetermined thickness over the cleaned surfaces of heat resistant members 7 and 7'. The silicon sealant layer 13 may comprise a silicon sealant commercially available under the trademark designation "RTA-88" mixed with a setting agent such as dibutyl tin dilaurate (DBT).

The mixing of silicon sealant and setting agent is carried out at atmosphere. The coating of silicon sealant layer 13 over the contact surfaces of heat resistant members 7 and 7' is achieved using a spatula.

Thereafter, the motor case 1 and the nozzle assembly 2 are positioned such that each throughout hole 12a of the nozzle assembly 2 is aligned with the corresponding threaded hole 8a of the motor case 1. Accordingly, a plurality of bolts 11 can be threadedly received in the corresponding threaded holes 8a via the corresponding throughout holes 12a. By fastening the bolts 11, the assembling of the motor case 1 with the nozzle assembly 2 is completed.

Since the assembling of the motor case 1 with the nozzle assembly 2 is carried out at atmosphere in accordance with this conventional method, air may be presented in a space defined between the first O-ring 9 and the silicon sealant layer 13 at the contact surfaces of the assembled portions. As the bolts 11 are fastened, the air is compressed and this compressed air can not escape outwardly through the first O-ring 9, but escapes through the silicon sealant layer 13, thereby forming an air passage 15 as shown in FIG. 4A or air pockets 16 as shown in FIG. 4B. Such air passage 15 and air pockets 16 still remain after the setting of silicon sealant layer 13.

In FIGS. 4A and 4B, the reference numeral 14 denotes an adhesive.

The air passage 15 and air pockets 16 formed in the silicon sealant layer 13 allow fume gases to penetrate the contact surfaces of the assembled portions therethrough during the operation of the rocket propulsion motor, thereby causing the O-rings to be damaged. In severe cases, peripheral elements disposed around the O-rings may be subjected to a fatal damage.

In particular, the process for assembling the rocket propulsion motor is a blind process. Moreover, the air passage and air pockets formed in the silicon sealant layer can be hardly found by a nondestructive test (NDT) carried out after the assembling. Even though such air passage and air pockets have been found, they can not be locally repaired.

These problems about sealing of the assembled portions encountered in assembling the rocket propulsion motor are important things directly affecting the performance of the rocket propulsion motor. For example, the space shuttle explosion accident in January, 1986 has been known as caused by a defect in sealing of the assembled portions of solid rocket propulsion motor.

In cases of solid rocket booster motors of space shuttles which has been presently developed by National Aeronautics and Space Administration (NASA), there is a problem about a damage of the assembled portions, since their assembling is carried out at atmosphere. Although several attempts for changing the design of the nozzle assembling parts were made, this problem could not be basically solved yet. It has been known that two of three kinds of O-rings disposed at the assembled portions were still subjected to a damage (Reference: AIAA 91-2292-CP, AIAA 89-2773).

SUMMARY OF THE INVENTION

Therefore, an object of the invention is to solve the above-mentioned problems caused by an incomplete sealing of assembled portions of a rocket propulsion motor assembled according to the prior art an to provide a method for assembling a rocket propulsion motor wherein the assembling is carried out under vacuum so that air can not be presented between a silicon sealant layer and a first O-ring disposed between a motor case and a nozzle assembly, during the assembling and seating, thereby preventing the generation of air passage and air pocket in a silicon sealant layer.

Another object of the invention is to provide a method for assembling a rocket propulsion motor involving mixing of a silicon sealant with a setting agent, wherein the mixing is carried out under vacuum, so as to prevent the silicon sealant from containing air.

In accordance with the present invention, these objects can be accomplished by providing a method for assembling a rocket propulsion motor including a motor case having at its inner periphery surface a heat resistant member and at its rear end a after dome flange provided with a plurality of threaded holes, a nozzle assembly having at its inner periphery surface a heat resistant member and at its outer periphery surface a nozzle flange provided with a plurality of throughout holes and a plurality of threaded holes, each of the throughout holes corresponding to each threaded hole of the motor case to receive a high tension bolt for coupling the nozzle assembly to the motor case, and first and second O-rings axially spaced from each other and disposed at the outer periphery surface of the nozzle flange, the method comprising the steps of: preparing a silicon sealant; coating the silicon sealant to a predetermined uniform thickness over the heat resistant members of the motor case and nozzle assembly; fastening the spacing bolts into the corresponding threaded holes of the nozzle flange such that the threaded end of each bolt is protruded beyond the corresponding threaded hole to a predetermined length; axially aligning the nozzle assembly with the motor case such that the end of the after dome flange of the motor case is positioned over the first O-ring; maintaining the interior of the motor case at a primary vacuum pressure to remove voids from the silicon sealant; applying a secondary vacuum pressure higher than the primary vacuum pressure to the interior of the motor case to move the nozzle assembly toward the motor case so that the threaded end of each spacing bolt comes into contact with the end surface of the after dome flange; and fastening the high tension bolts into the threaded holes of the motor case.

BRIEF DESCRIPTION OF THE DRAWINGS

Other objects and aspects of the invention will become apparent from the following description of embodiments with reference to the accompanying drawings in which:

FIGS. 4A and 4B are partial sectional views of the assembled surfaces of a motor case and a nozzle assembly, wherein FIG. 4A is for the case that an air passage is formed in a silicon sealant layer, while FIG. 4B is for the case that air pockets are formed in a silicon sealant layer.

DESCRIPTION OF THE PREFERRED EMBODIMENTS

Figure 5:
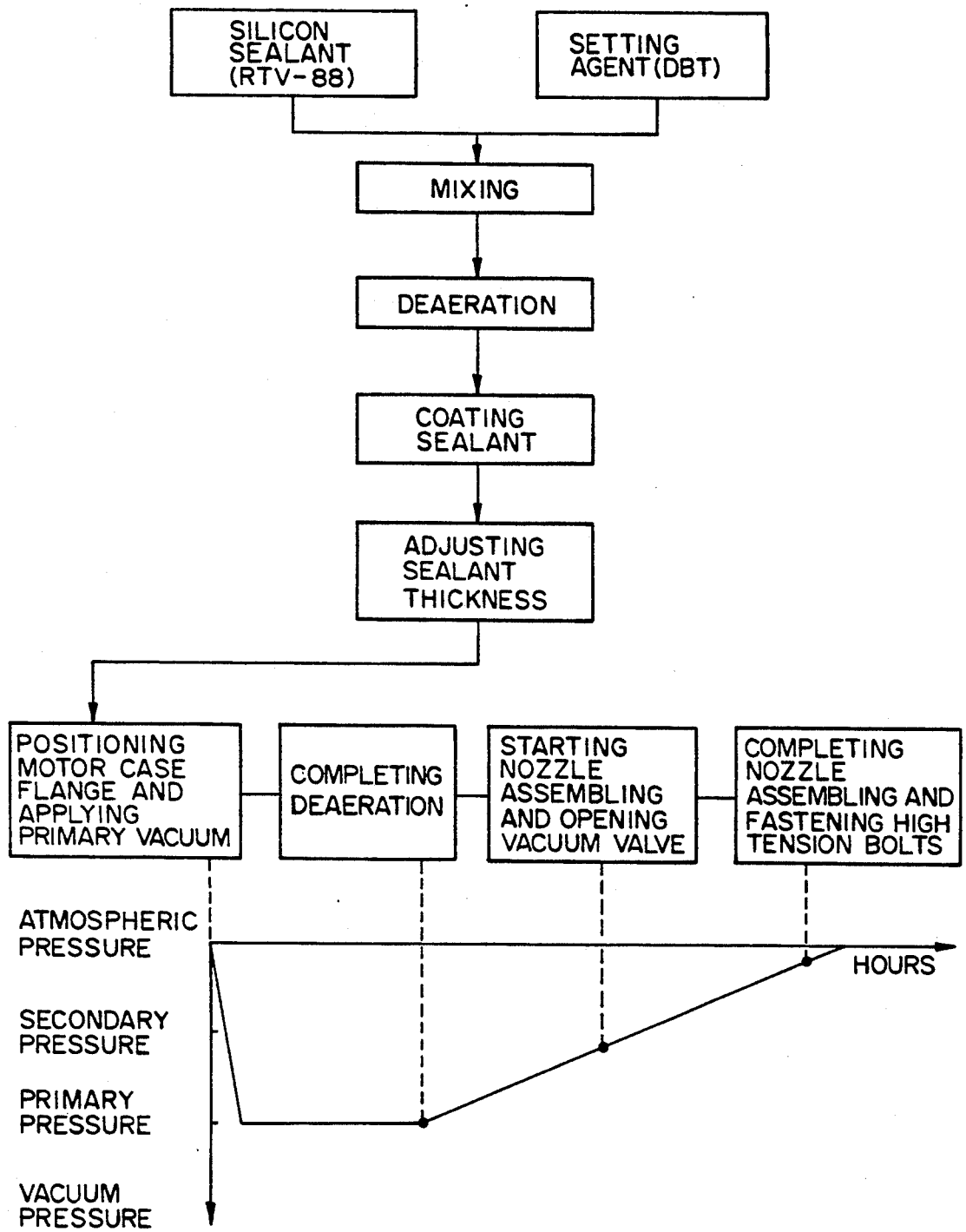
FIG. 5 is a flow chart illustrating a method of assembling a rocket propulsion motor in accordance with the present invention.

Referring to FIG. 5, there is illustrated a method of assembling a rocket propulsion motor comprising a motor case and a nozzle assembly in accordance with the present invention. The rocket propulsion motor to be manufactured has the same construction as that shown in FIG. 3. Accordingly, the constituting element of the rocket propulsion motor are denoted in the following description, by the reference numerals used in FIG. 3.

As shown in FIG. 5, first, a silicon sealant is prepared by mixing a silicon sealant material commercially available under the trademark designation "PVT-88" with 0.1% to 0.5% of DBT. The obtained silicon sealant is then contained in a container. Thereafter, a vacuum condition of an absolute pressure of about 25 mmHg is made in the container by using a vacuum pump, so as to achieve a deaeration of voids contained in the silicon sealant during the mixing, in accordance with the present invention.

Figure 1:
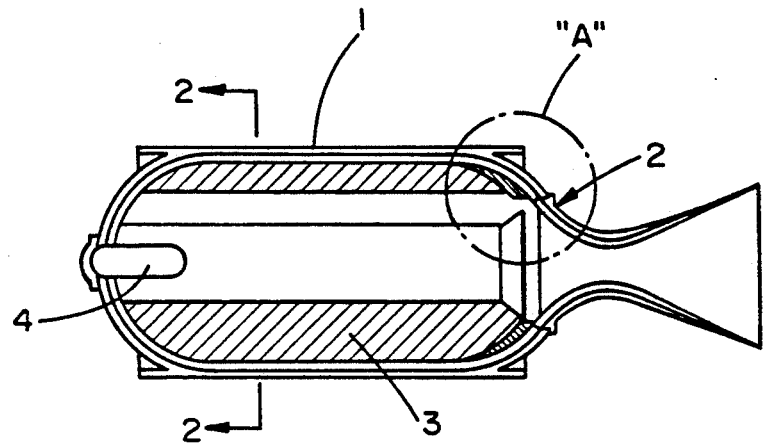
FIG. 1 is a sectional view of the overall construction of a general rocket propulsion motor.
Figure 2:
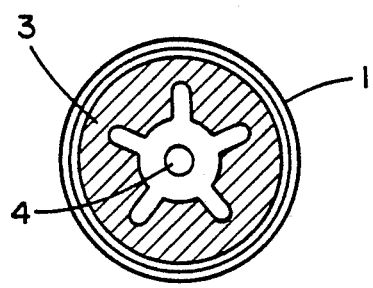
FIG. 2 is a cross-sectional view taken along the line A—A of FIG. 1.
Figure 3:
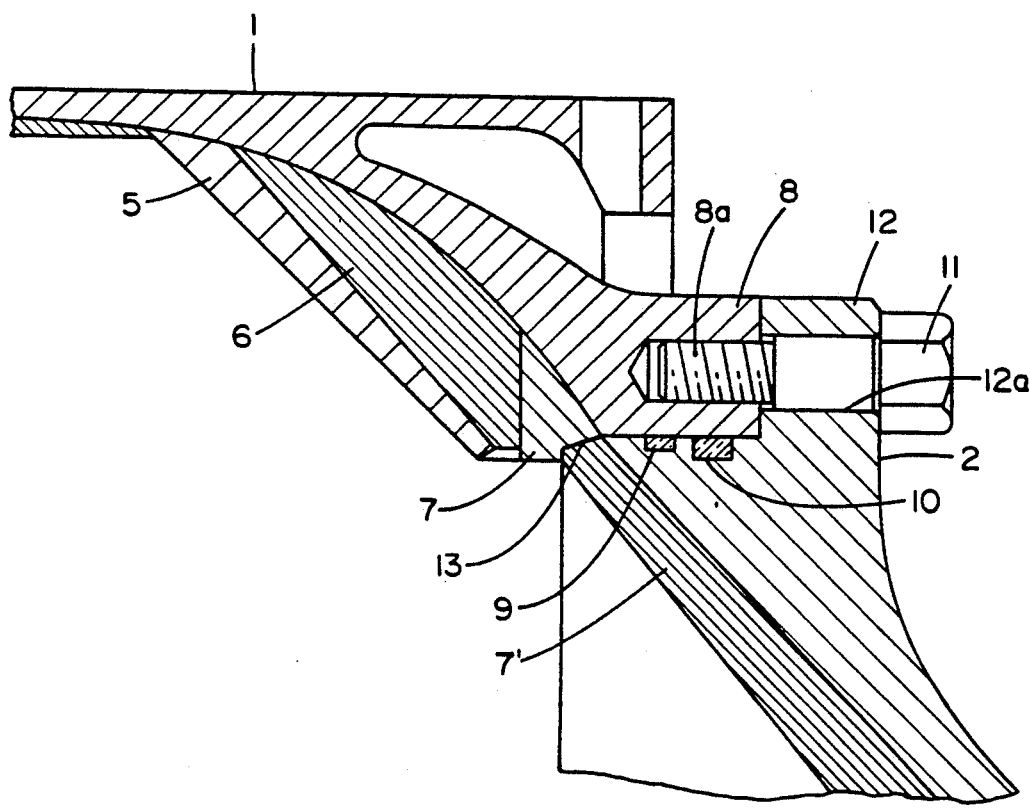
FIG. 3 is an enlarged view of a portion "A" of FIG, 1.
Figure 4A:
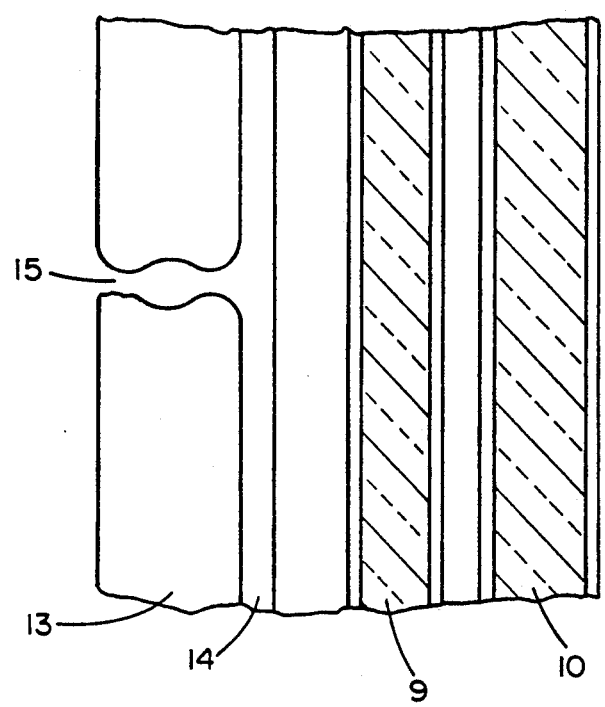
Figure 4B:
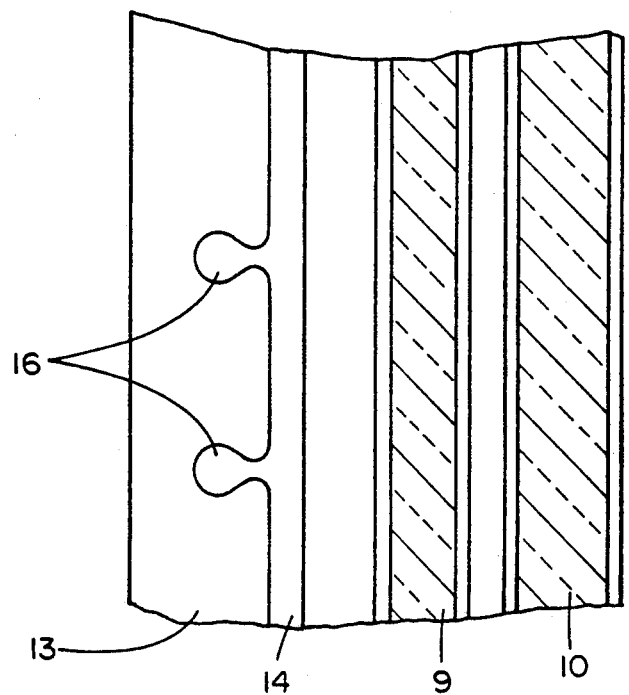

A pair of O-rings, that is, first and second O-rings 9 and 10 shown in FIG. 3 are prepared and uniformly coated with a lubricant. The O-rings are then fitted in annular grooves formed at the nozzle assembly 2.

Into a plurality of spacing bolt holes (although not shown, four bolt holes uniformly spaced at 90° are provided) each formed between adjacent throughout holes 12a of the nozzle flange 12, bolts (not shown) are fastened, respectively, such that the threaded end of each bolt is protruded beyond the corresponding bolt hole, to reach a position just before the groove for receiving the first O-ring 9.

Thereafter, the silicon sealant which has been subjected to the deaeration is uniformly coated to a predetermined thickness over the surfaces of heat resistant members 7 and 7'. Prior to the coating of silicon sealant, foreign matters and oils are removed from the surfaces of heat resistant members 7 and 7'. The coating of silicon sealant is carried out using a spatula.

The thickness of silicon sealant layer is adjusted by a thickness adjusting gage, taking into consideration the sealant thickness according to the rocket propulsion motor design standard.

Subsequently, the motor case 1 and the nozzle assembly 2 are coupled together. At this time, the end of the after dome flange 8 of motor case 1 is once disposed over the first O-ring 9 of the nozzle assembly 2.

That is, this primary assembling of the motor case 1 and nozzle assembly 2 is carried out by inserting the high tension bolts 11 into the corresponding throughout holes 12a of nozzle flange 12 and fastening them into the corresponding threaded holes 8a such that the end of the after dome flange 8 of motor case 1 is disposed over the first O-ring 9 of the nozzle assembly 2.

After this primary assembling, the threaded end of each bolt is in contact with the end surface of the after dome flange 8.

Then, a test is made as to whether a gap has been formed between the motor case 1 and the nozzle assembly 2. Subsequently, the interior of motor case 1 is maintained under a primary vacuum pressure for a predetermined period (generally, at least 3 minutes) so that voids formed in the silicon sealant layer 13 are completely removed. The primary vacuum pressure is supplied through a hole of the motor case 1 in which the ignitor 4 will be fitted.

After the removal of voids from the silicon sealant layer 13, a vacuum adjusting valve (not shown) which is communicated with the motor case 1 is opened so that the interior of motor case 1 is maintained under a secondary vacuum pressure higher than the primary vacuum pressure. At this time, the nozzle assembly 2 is prevented from coming into contact with the motor case 1 by virtue of the spacing bolts coupled to the nozzle assembly 2. By the secondary vacuum pressure, air under pressure is vented out of the space defined between the first O-ring 9 and the silicon sealant layer 13. As the spacing bolts are simultaneously loosened, their threaded ends are moved rearwardly and thus the nozzle assembly 2 is forwardly moved toward the motor case 1, by virtue of the vacuum pressure exerted in the interior of motor case 1. Finally, the end surface of nozzle flange 12 comes in close contact with the end surface of after dome flange 8.

Thereafter, the high tension bolts 11 are fastened into the corresponding threaded holes 8a, while the spacing bolts are removed from the nozzle flange 12. Thus, the assembling of the rocket propulsion motor is completed.

As apparent from the above description, the method for assembling a rocket propulsion motor according to the present invention achieves removal of voids contained in the silicon sealant layer by the primary vacuum pressure maintained in the motor case and removal of compressed air from the space defined between the first O-ring and the silicon sealant layer by the secondary vacuum pressure maintained in the motor case. Accordingly, it is possible to prevent air voids and air pockets from being formed in the set silicon sealant layer and thus ensure a perfect sealing in the assembled portions of the rocket propulsion motor.

Since the assembling of the motor case with the nozzle assembly is carried out under vacuum in accordance with the present invention, the facing end surfaces of the after dome flange and nozzle flange are maintained at a uniform distance through 360° and gradually moved toward each other to be coupled together. As a result, there is no damage of O-rings caused by an irregular contact between the O-rings and the after dome flange.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A method of assembling a rocket propulsion motor having a motor case with an interior and, a nozzle assembly, the motor case having a thermal insulation at an inner periphery surface of the motor case, and, an after dome flange provided with a plurality of threaded holes at an end of the motor case, the nozzle assembly having a thermal insulation at an inner periphery surface of said nozzle assembly, and, a nozzle flange at an outer periphery surface of the nozzle assembly and provided with a plurality of throughout holes and a plurality of threaded spacing holes, each of the throughout holes corresponding to each threaded spacing hole of the motor case to receive a high strength bolt for coupling the nozzle assembly to the motor case, and first and second O-rings spaced apart from each other and disposed at the outer periphery surface of the nozzle flange, the method comprising the steps of:

preparing a silicon sealant;

coating the silicon sealant to a predetermined uniform thickness over the thermal insulation of the motor case and nozzle assembly;

fastening a plurality of spacing bolts having threaded ends thereof into the corresponding threaded spacing holes of the nozzle flange such that a threaded end of each bolt is protruded beyond the corresponding threaded spacing hole to a predetermined length;

aligning the nozzle assembly with the motor case such that an end of the after dome flange of the motor case is positioned over the first O-ring;

maintaining the interior of the motor case at a primary vacuum pressure to remove voids from the silicon sealant;

applying a secondary vacuum pressure higher than the primary vacuum pressure to the interior of the motor case to move the nozzle assembly toward the motor case while simultaneously loosening the spacing bolts so that the the nozzle flange comes into contact with the after dome flange; and fastening the high strength bolts into the threaded holes of the motor case.

2. A method in accordance with claim 1, wherein the step of preparing the silicon sealant comprises the steps of uniformly mixing a silicon sealant material with a setting agent to form a silicon sealant mixture, and maintaining said mixture under vacuum condition to remove voids contained in the silicon sealant during the mixing.

3. A method in accordance with claim 1, wherein the step of applying a secondary vacuum pressure further includes the step of eliminating any entrapped air present between said first O-ring and said silicon sealant.

* * * * *